(12) United States Patent
Choi et al.

(10) Patent No.: US 8,107,417 B2
(45) Date of Patent: Jan. 31, 2012

(54) METHOD AND MOBILE TERMINAL FOR ALLOCATING IP ADDRESS IN WIRELESS NETWORK

(75) Inventors: Jin-Hyeock Choi, Suwon-si (KR); Hee-Jin Jang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 919 days.

(21) Appl. No.: 11/826,881

(22) Filed: Jul. 19, 2007

(65) Prior Publication Data

US 2008/0031189 A1  Feb. 7, 2008

Related U.S. Application Data

(60) Provisional application No. 60/835,421, filed on Aug. 4, 2006.

(30) Foreign Application Priority Data

Nov. 16, 2006 (KR) .................. 10-2006-0113232

(51) Int. Cl.
*H04W 4/00* (2009.01)
(52) U.S. Cl. ........ 370/328; 370/329; 370/331; 370/389; 370/465; 709/222
(58) Field of Classification Search .................. 370/328, 370/338, 389, 401, 465; 709/220–223, 245
See application file for complete search history.

(56) References Cited

U.S. PATENT DOCUMENTS

| | | | |
|---|---|---|---|
| 6,728,232 B2 | 4/2004 | Hasty, Jr. et al. | |
| 7,606,201 B2 * | 10/2009 | Zhang et al. | 370/331 |
| 7,734,745 B2 * | 6/2010 | Gloe | 709/223 |
| 7,889,705 B2 * | 2/2011 | Choi et al. | 370/338 |
| 8,000,297 B2 * | 8/2011 | Hong et al. | 370/331 |
| 8,005,080 B2 * | 8/2011 | Jun et al. | 370/389 |
| 2002/0176363 A1 | 11/2002 | Durinovic-Johri et al. | |
| 2003/0026230 A1 * | 2/2003 | Ibanez et al. | 370/338 |
| 2003/0081578 A1 * | 5/2003 | White et al. | 370/338 |
| 2004/0081122 A1 * | 4/2004 | Koodli et al. | 370/329 |
| 2004/0174904 A1 | 9/2004 | Kim et al. | |
| 2004/0177146 A1 * | 9/2004 | Ishiyama et al. | 709/226 |
| 2004/0240669 A1 * | 12/2004 | Kempf et al. | 380/277 |
| 2005/0036471 A1 * | 2/2005 | Singh et al. | 370/338 |
| 2005/0053011 A1 * | 3/2005 | Ohbayashi et al. | 370/252 |
| 2005/0265360 A1 * | 12/2005 | Kim et al. | 370/400 |
| 2006/0140164 A1 * | 6/2006 | Patel et al. | 370/338 |

FOREIGN PATENT DOCUMENTS

| | | |
|---|---|---|
| EP | 1 422 886 | 5/2004 |
| KR | 10-2003-0024104 | 3/2003 |
| KR | 10-2006-0066580 | 6/2006 |

* cited by examiner

*Primary Examiner* — Robert Scheibel
*Assistant Examiner* — Mark A Mais
(74) *Attorney, Agent, or Firm* — NSIP Law

(57) ABSTRACT

A method and mobile terminal for allocating an Internet protocol (IP) address in a wireless network. A method of allocating an IP address in a wireless network which is applied to a system including a mobile terminal and an access router (AR) storing IP addresses, which are used on a connected link, in an address cache, managing the IP addresses, and performing a duplicate address detection (DAD) based on the IP addresses, the method including confirming whether a notification message, transmitted from the AR, is received, and automatically configuring an IP address and requesting the AR to perform the DAD with respect to the automatically configured IP address, when the notification message is received.

27 Claims, 7 Drawing Sheets

METHOD AND MOBILE TERMINAL FOR
ALLOCATING IP ADDRESS IN WIRELESS
NETWORK

CROSS-REFERENCE TO RELATED APPLICATION

This application claims the benefit under 35 U.S.C. §119(e) of U.S. Provisional Application No. 60/835,421, filed on Aug. 4, 2006, in the U.S. Patent and Trademark Office, and under 35 U.S.C. §119(a) of Korean Patent Application No. 10-2006-0113232, filed on Nov. 16, 2006, in the Korean Intellectual Property Office, the entire disclosure of both of which are hereby incorporated by reference.

BACKGROUND OF THE INVENTION

1. Field of the Invention

The following description relates to a wireless network. More particularly, the present invention following description relates to a method and mobile terminal for allocating an Internet protocol (IP) address in a wireless network which may prevent Internet protocol version 6 (IPv6) addresses auto-configured in the mobile terminal from conflicting.

2. Description of Related Art

Generally, an Internet protocol version 4 (IPv4)-based network has been used for data communications between mobile terminals and communication nodes in a wired/wireless communication network. Since IPv4 uses an address system of 32 bits, addresses which may be allocated are becoming exhausted in the IPv4-based network as Internet usages increase. Accordingly, Internet engineering task force (IETF) standardized Internet protocol version 6 (IPv6) using an address system of 128 bits.

Similar to the description above, since it is difficult that a user manually configures an IP address as IP address systems increase, efforts are required to be exerted for automatically allocating the IP address via interactions between mobile terminals and communication nodes in the IPv6-based network.

An IPv6 address is generally allocated in mobile terminals by one of three methods described below. Specifically, the three methods correspond to i) a static configuration method configuring network information in each host by hand, ii) a dynamic configuration method providing a host with network information by using a network protocol such as a dynamic host configuration protocol (DHCP) according to a request, and iii) an automatic configuration method configuring network information according to a policy determined by a rule between all hosts in a network.

The dynamic configuration method is also referred to as a "statefull auto-configuration method" using a server such as the DHCP, and obtaining an address, and any one of addresses which may be allocated in the server is allocated to a host side when a host side makes a request for an address to a DHCP server. Accordingly, the server is required to have a large-scale database, and be strictly managed.

The automatic configuration method is also referred to as a "stateless auto-configuration method" which a host side spontaneously generates an address. Specifically, the automatic configuration method generates an address using interface identification (ID) information of the host side, prefix information obtained from a router, or well-known prefix information. Therefore, the host is responsible for generating and allocating the address of the host.

However, since it is required that the access router (AR) in the network should manage all IP addresses which a mobile terminal uses, a problem may occur in operating the network when the AR is unaware of an automatically-configured IP address although the mobile terminal configures the IP address spontaneously and automatically.

Accordingly, there is a need for a method and mobile terminal for allocating an Internet protocol (IP) address in a wireless network which can prevent Internet protocol version 6 (IPv6) addresses auto-configured in the mobile terminal from conflicting.

SUMMARY OF THE INVENTION

General aspects address at least the above problems and/or disadvantages. Accordingly, a general aspect is to provide a method and mobile terminal for allocating an Internet protocol (IP) address in a wireless network in which the mobile terminal, when an access router (AR) transmits a message indicating the AR corresponds to a management AR, automatically configures an Internet protocol version 6 (IPv6) address, performs a duplicate address detection (DAD) with respect to the automatically configured IPv6 address via the AR, and validly uses the automatically configured IPv6 address, in order to prevent IPv6 addresses automatically configured in the mobile terminal from conflicting.

According to a general aspect, there is provided a method of allocating an Internet protocol (IP) address in a wireless network which is applied to a system including a mobile terminal and an access router (AR) storing IP addresses, which are used on a connected link, in an address cache, managing the IP addresses, and performing a duplicate address detection (DAD) based on the IP addresses, the method including confirming whether a notification message, transmitted from the AR, is received; and automatically configuring an IP address and requesting the AR to perform the DAD with respect to the automatically configured IP address, when the notification message is received.

According to a general aspect, there is provided a method of allocating an IP address in a wireless network which is applied to a system including a mobile terminal and an AR, the method including transmitting a notification message for informing of storing IP addresses, which are used on a connected link, in an address cache, managing the IP addresses, and performing a DAD based on the IP addresses to the mobile terminal, and confirming whether a request message, requesting the performing of the DAD with respect to an automatically configured IP address from the mobile terminal, is received.

According to a general aspect, there is provided a mobile terminal for allocating an IP address in a wireless network which is applied to a system including a mobile terminal and an AR storing IP addresses, which are used on a connected link, in an address cache, managing the IP addresses, and performing a DAD based on the IP addresses, the mobile terminal including a transceiving unit for receiving a notification message, transmitted from the AR, and for transmitting a request message, which requests the AR to perform the DAD with respect to the automatically configured IP address, to the AR, and a control unit for automatically configuring an IP address, generating the request message, and outputting the generated request message, when the notification message is inputted by the transceiving unit.

According to a general aspect, there is provided an AR for allocating an IP address in a wireless network which is applied to a system including a mobile terminal and the AR, the AR including a transceiving unit for transmitting a notification message for informing of storing all IP addresses, which are used on a connected link, in an address cache, managing the IP addresses, transmitting a notification message to the mobile terminal to display performing a DAD based on the IP addresses and receiving a request message, which requests performing of the DAD with respect to the automatically configured IP address, from the mobile terminal, and a control unit for receiving the request message from the transceiving unit and performing the DAD according to the request message.

Other aspects and features will become apparent to those skilled in the art from the following detailed description when taken in conjunction with the annexed drawings and the claims.

BRIEF DESCRIPTION OF THE DRAWINGS

The above and other aspects and features will be more apparent from the following detailed description, taken in conjunction with the accompanying drawings in which.

DETAILED DESCRIPTION

The following description is provided to assist in a comprehensive understanding of general aspects. Accordingly, those of ordinary skill in the art will recognize that various changes and modifications can be made without departing from the scope of the claims. Also, descriptions of well-known functions and constructions are omitted for clarity and conciseness.

It is assumed that a mobile terminal for allocating an Internet protocol (IP) address in a wireless network may be realized into at least one of a mobile communication terminal, a public switched telephone network (PSTN) terminal, a voice over Internet protocol (VoIP), a session initiation protocol (SIP) terminal, a media gateway controller (Megaco) terminal, a personal digital assistant (PDA), a cellular phone, a personal communication service (PCS) phone, a hand-held personal computer (PC), a code division multiple access (CDMA)-2000(1X, 3X) phone, a wideband CDMA (WCDMA) phone, a dual band/dual mode phone, a global system for mobile communication (GSM) phone, a mobile broadband system (MBS) phone and a satellite/terrestrial digital multimedia broadcasting (DMB) phone.

Figure 1:
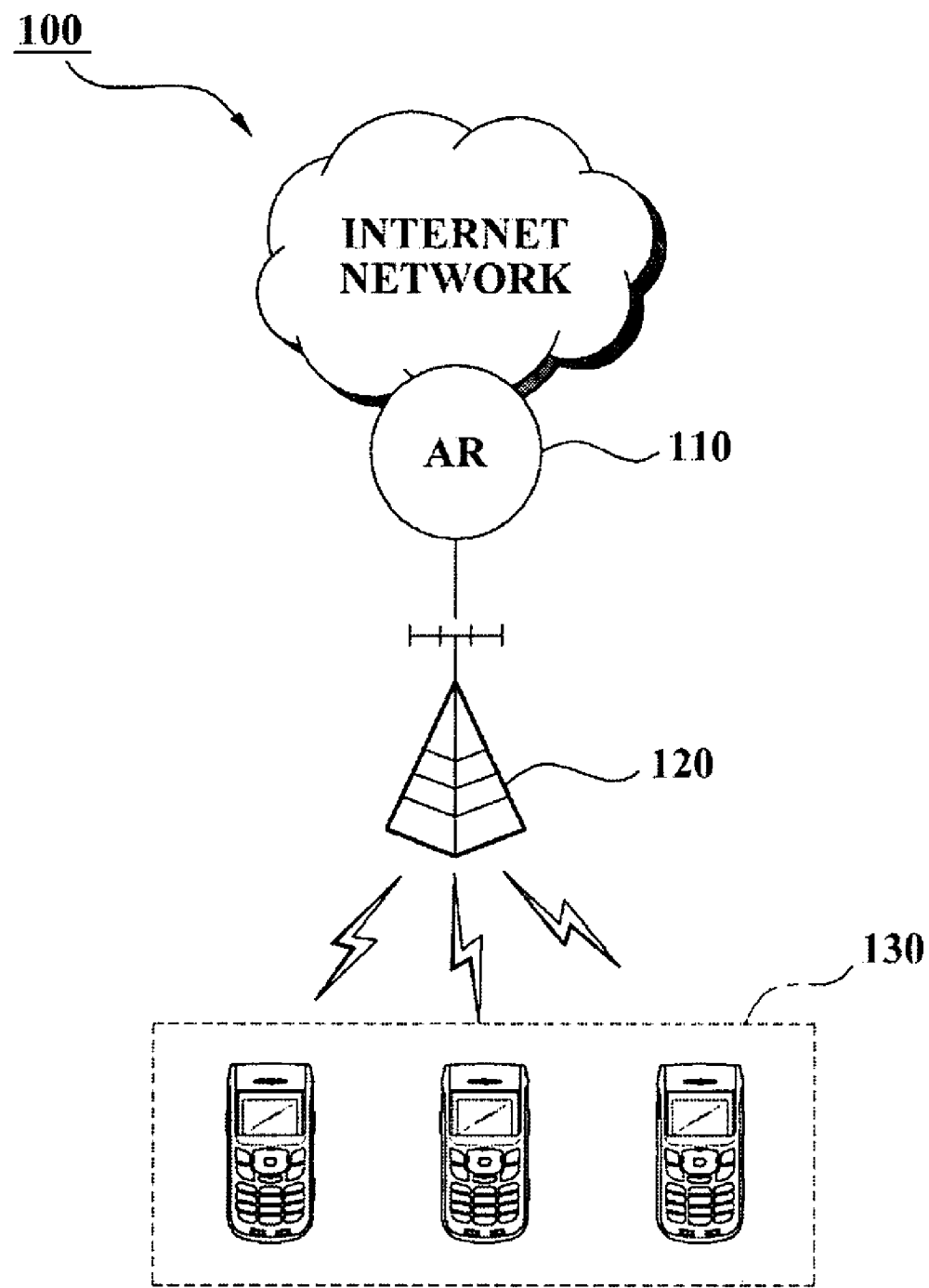
FIG. 1 is a diagram illustrating an example of an Internet protocol version 6 (IPv6)-based wireless network.

FIG. 1 is a diagram illustrating an example of an Internet protocol version 6 (IPv6)-based wireless network.

As illustrated in FIG. 1, the IPv6-based wireless network 100 may include an access router (AR) 110, a base station 120, and a mobile terminal 130.

As illustrated in FIG. 1, the IPv6-based wireless network 100 according to an exemplary embodiment of the present invention may include an access router (AR) 110, a base station 120, and a mobile terminal 130.

The AR 110 may transmit a notification message to at least one mobile terminal 130. The notification message informs that the AR 110 corresponds to a particular AR. The particular AR stores all IP addresses and link-layer addresses in an address cache, manages the all IP addresses and the link-layer addresses, and performs a duplicate address detection (DAD) based on an IP address. In this case, the all IP addresses are used on a connected link, and the link-layer addresses corresponds to the all IP addresses.

The AR 110 may store the IP address in the address cache and transmit a response message to the mobile terminal 130 when the IP address does not exist in the address cache.

The base station 120 may transmit the notification message, a request message, and the response message. The notification message includes a router advertisement (RA) message between the AR 110 and the mobile terminal 130. The request message includes a neighbor solicitation (NS) message, and the response message includes a neighbor advertisement (NA) message.

The mobile terminal 130 may automatically configure the IP address and transmit the request message to the AR 110. The request message requests the DAD with respect to the automatically configured IP address. The mobile terminal 130 may validly allocate the automatically configured IP address according to a result of the performing of the DAD.

Figure 2:
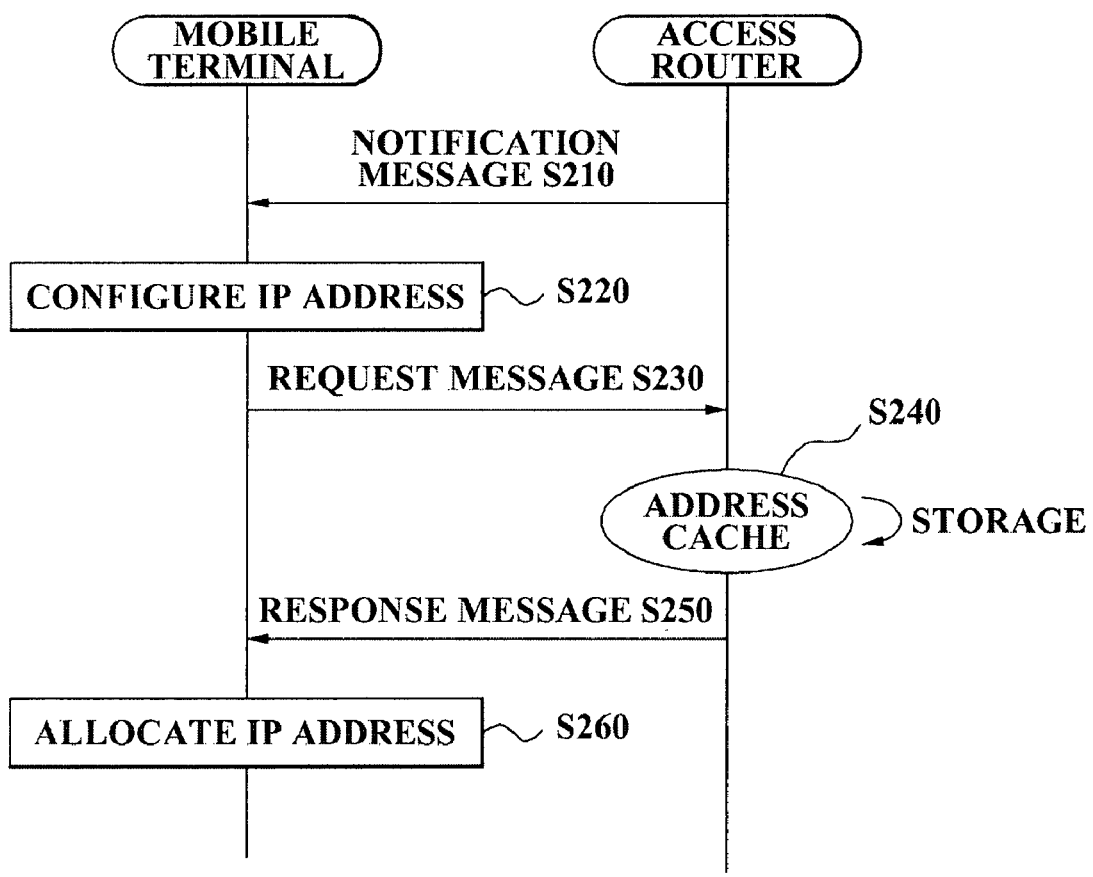
FIG. 2 is a flowchart illustrating an example of a method of allocating an Internet protocol (IP) address to a mobile terminal in a wireless network.

FIG. 2 is a flowchart illustrating an example of a method of allocating an IP address to a mobile terminal in a wireless network.

As illustrated in FIG. 2, the method of allocating an IP address to a mobile terminal in a wireless network may include an operation of receiving a notification message S210, an operation of automatically configuring the IP address S220, an operation of transmitting a request message S230, an operation of performing a DAD S240, an operation of receiving a response message S250 and an operation of validly allocating the IP address S260.

Specifically, in operation S210, an AR 110 may generate the notification message and transmit the generated notification message to at least one mobile terminal 130. The notification message informs that the AR 110 corresponds to a particular AR which stores all IP addresses and link-layer addresses in an address cache, manages the all IP addresses and the link-layer addresses and performs a DAD based on an IP address. In this case, the all IP addresses are used on a connected link and the link-layer addresses corresponds to the all IP addresses. In this case, the notification message includes an Internet control message protocol version 6 (ICMPv6) RA message defined in a neighbor discovery protocol for Internet protocol version 6 (IPv6). A format of such notification message is described in detail with reference to FIG. 3.

Figure 3:
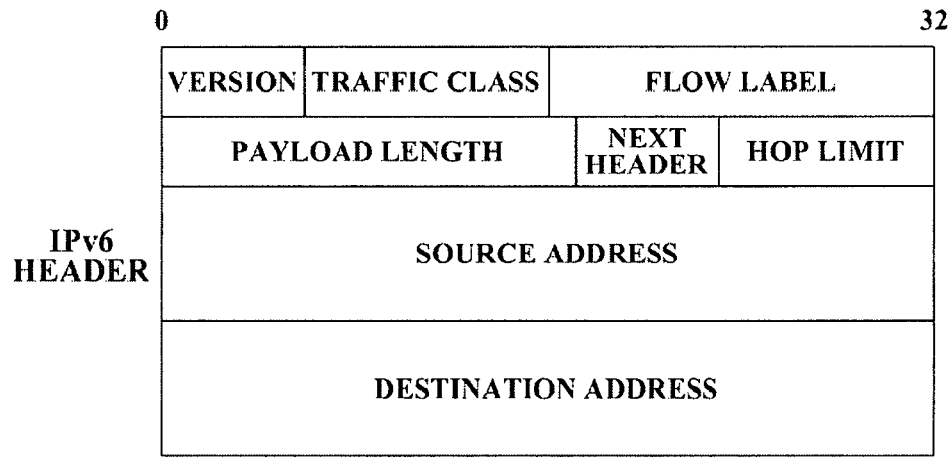
FIG. 3 is a diagram illustrating an example of a format of a notification message.
Figure 3:
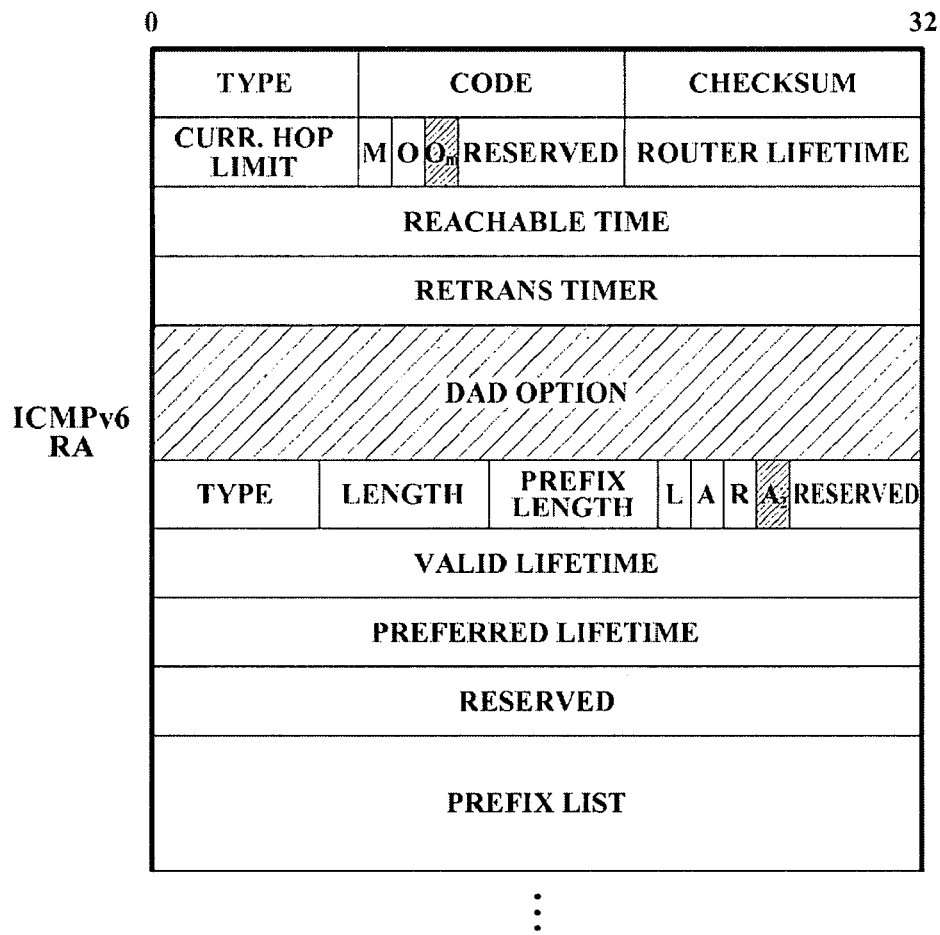

FIG. 3 is a diagram illustrating an example of a format of a notification message.

As illustrated in FIG. 3, the notification message may include an IPv6 header and an ICMPv6 RA message. The ICMPv6 RA message may include a type field indicating a type of a message, a code field indicating an additional code which is provided for each message type, a checksum field for performing a checksum operation, a Curr Hop Limit field indicating a current hop limit, an M field and an O field always having an off value, an Om field indicating a particular AR, a reserved field which is not used, a router lifetime field indicating a lifetime of a default router, a reachable time field indicating an arrival reach time of a transmitted NS message, a retrans timer field indicating a period of time between retransmitted NS messages and an option field for adding an option.

In this case, the Om field indicates that the AR 110 corresponds to an omniscient AR. Specifically, the Om field is newly added to inform that the AR 110 corresponds to a particular AR, for example, 1) the particular AR stores all IP addresses, which are used on a connected link, in an address cache, and manages the all IP addresses and 2) performs a DAD based on an IP address.

For this, the ICMPv6 RA message may add a DAD option. The DAD option may include a field indicating a characteristic of the connected link, a field indicating a number of times the DAD is requested, a field indicating a DAD method of the connected link and a field indicating a period of time that the IP address is stored in the address cache.

Also, the ICMPv6 RA message may add a prefix information option. The prefix information option may correspond to a prefix used for a stateless address auto-configuration, for example, an A2 field.

In operation S210, the mobile terminal 130 confirms whether the notification message, which is previously set described above, is received from the AR 110. Specifically, in operation S220, the mobile terminal 130 automatically configures the IP address when receiving the notification message.

In operation S230, the mobile terminal 130 generates the request message including the automatically configured IP address. Also, in operation S230, the mobile terminal 130 transmits the generated request message to the AR 110 in a unicast manner and may request the DAD. In this case, the request message includes an ICMPv6 NS message defined in a neighbor discovery protocol for IPv6. A format of such a request message is described in detail with reference to FIG. 4.

Figure 4:
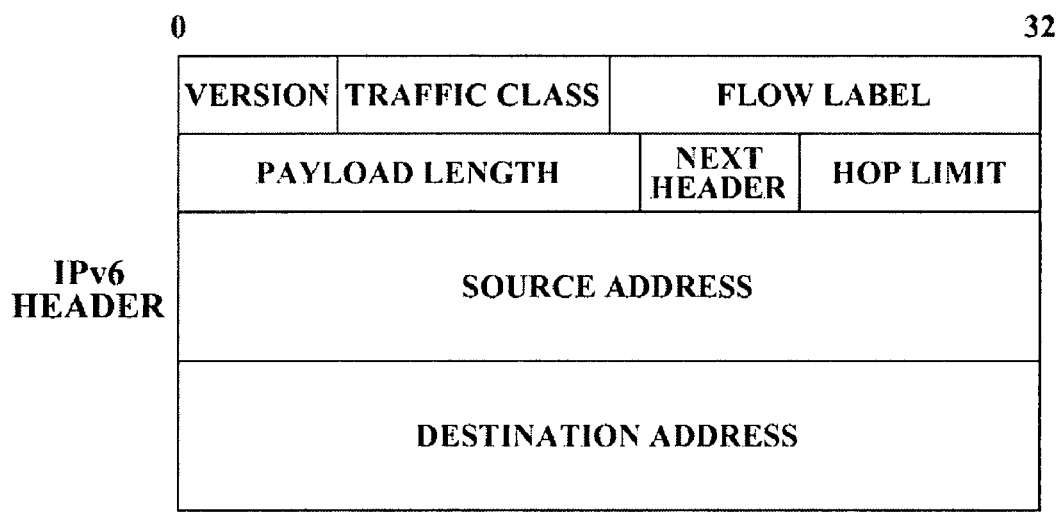
FIG. 4 is a diagram illustrating an example of a format of a request message.
Figure 4:
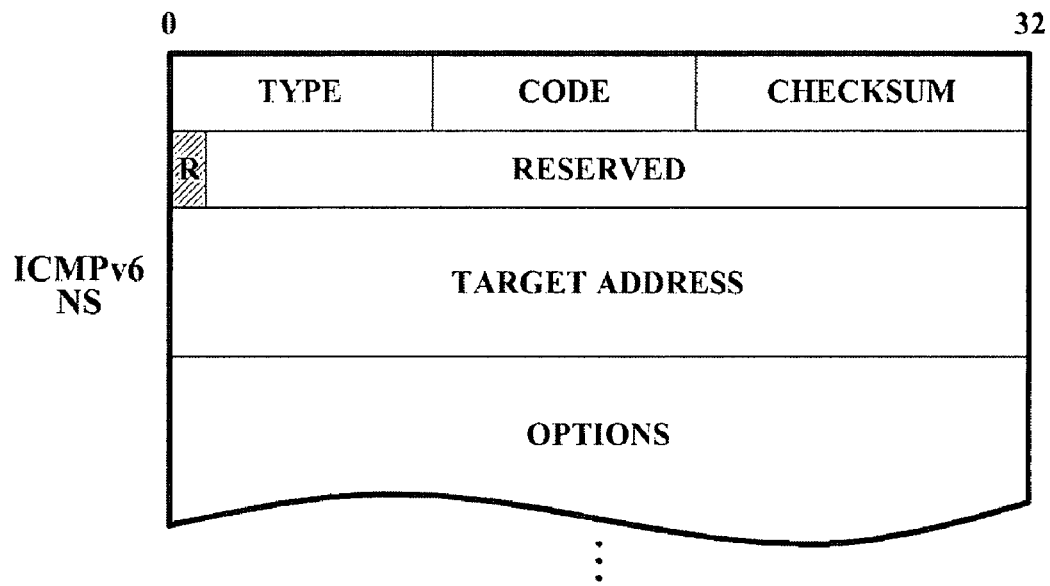

FIG. 4 is a diagram illustrating an example of a format of a request message.

As illustrated in FIG. 4, the request message may include an IPv6 header and an ICMPv6 NS message. The ICMPv6 NS message may include a type field indicating a type of a message, a code field indicating an additional code which is provided for each message type, a checksum field for performing a checksum operation, an R field for requesting performing of a DAD, a reserved field which is not used, a target address field for a target IP address of the message and an option field for adding an option.

In this case, the R field refers to a field which is newly added to the ICMPv6 NS message to request the performing of the DAD with respect to a target address.

As an example, a mobile terminal 130 generates the request message including an IP header and the ICMPv6 NS message. Also, the mobile terminal 130 may transmit the generated request message to an AR 110. That is, the request message may include a plurality of address fields. Specifically, an IP address of the AR 110 may be set in a destination address field, an automatically configured IP address may be set in a source address field and a target address field, and a link-layer address of the mobile terminal 130 may be set in a source link-layer address field.

Then, the AR 110 confirms whether the request message is received from the mobile terminal 130. The request message requests for the DAD with respect to an automatically configured IP address. Specifically, the AR 110 receives the request message, and checks the R field of the ICMPv6 NS message included in the received request message. Accordingly, the AR 110 may determine whether the DAD with respect to the automatically configured IP address is requested.

In operation S240, the AR 110 may perform the DAD with respect to the automatically configured IP address included in the request message, since the IP address, which is configured in a plurality of mobile terminals, may be stored in the address cache and be managed by the AR 110. Specifically, the AR 110 may confirm whether the IP address, included in the request message, exists in the address cache which is managed by the AR 110, when the request message is received.

When the IP address does not exist in the address cache, the AR 110 may store the IP address in the address cache and transmit the response message to the mobile terminal 130 in the unicast manner. In this case, the response message may include an ICMPv6 NA message defined in a neighbor discovery protocol for IPv6. A format of such response message is described in detail with reference to FIG. 5.

Figure 5:
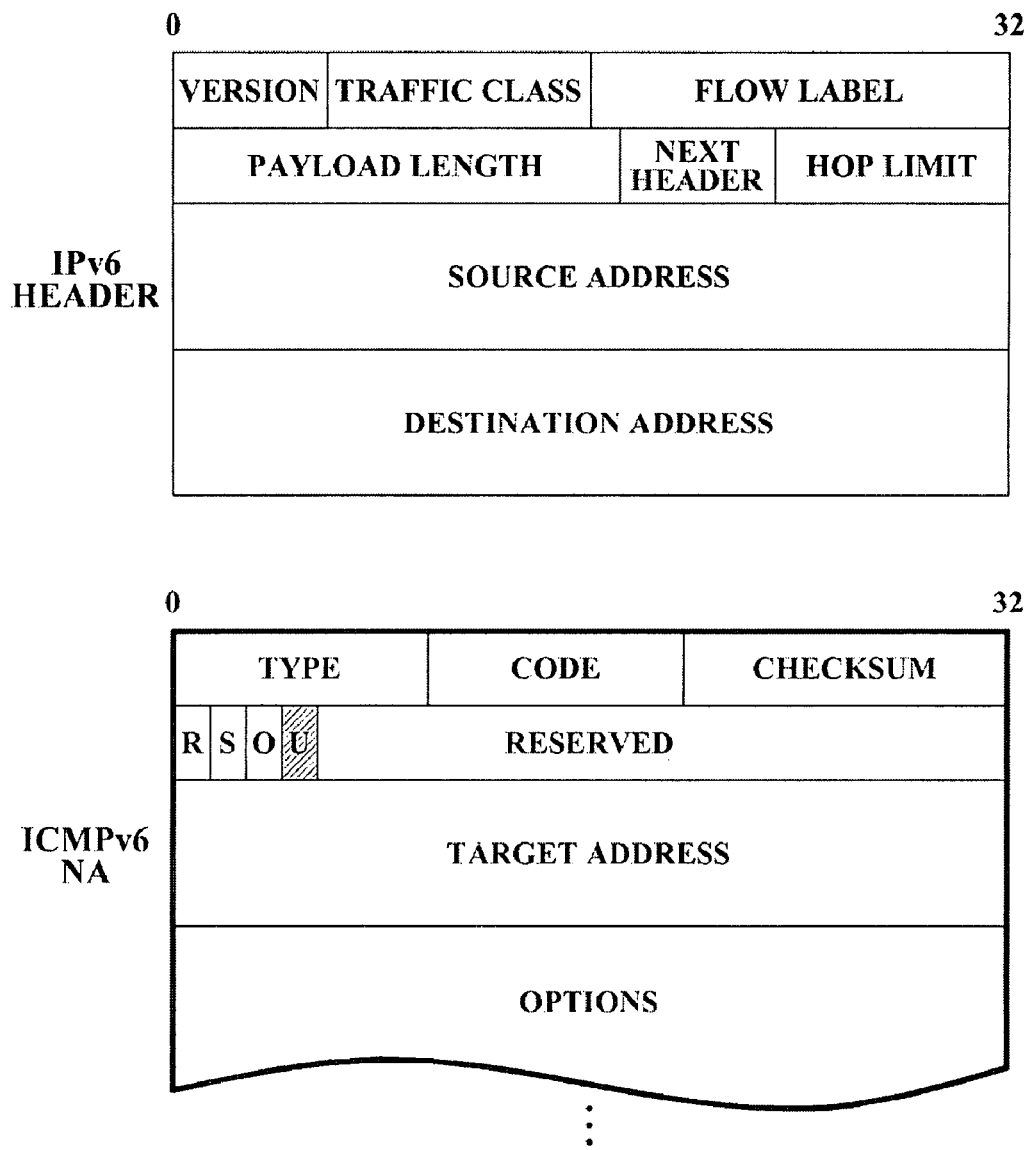
FIG. 5 is a diagram illustrating an example of a format of a response message.

FIG. 5 is a diagram illustrating an example of a format of a response message.

As illustrated in FIG. 5, the response message may include an IPv6 header and an ICMPv6 NA message. The ICMPv6 NA message includes a type field indicating a type of a message, a code field indicating an additional code which is provided for each message type, a checksum field for performing a checksum operation, an R field for indicating that a transmitter is an AR, a S field for indicating the response message is a response to an ICMPv6 NS message, an O field for indicating that an existing cache entry is required to be overridden, a U field for responding to a request for a DAD, a reserved field which is not used, a target address field for a target IP address of a message and an option field for adding an option.

In this case, the U field refers to a field which is newly added to the ICMPv6 NA message to respond to the request for the DAD with respect to the target address.

As an example, the AR 110 may generate an IP header and a response message including the ICMPv6 NA message, and transmit the generated response message to a mobile terminal 130. That is, the response message may have a plurality of IP address fields. Specifically, an automatically configured IP address may be set in an destination address field and a target address field, an IP address of the AR 110 may be set in a source address field and a link-layer address may be set in a source link-layer address field.

In this case, a request message received from the mobile terminal 130 may refresh a storage time with respect to the IP address which is stored in an address cache. Accordingly, when the IP address exists in the address cache, whether the link-layer address exists is required to be confirmed.

The AR 110 does not perform an operation, for example, an operation of responding to the request message, when the IP address exists in the address cache and the IP address exists in another mobile terminal using the IP address, for example, a link-layer address, which is identical to the link-layer address included in the request message, exists.

When the IP address exists in the address cache, and the IP address does not exist in another mobile terminal using the IP address, for example, the link-layer address, which is identical to the link-layer address included in the request message, does not exist, the AR 110 may refresh the storage time of the IP address.

Accordingly, in operation S250, the mobile terminal 130 receives the response message from the AR 110. In operation S260, the mobile terminal 130 confirms a result of the request for the DAD from the received response message, and may validly allocate the IP address according to the confirmed request for the DAD. Specifically, when the response message is received, the mobile terminal 130 may validly use the IP address. When the response message is not received, the mobile terminal 130 may discard the IP address.

Also, when the mobile terminal 130 may not receive the response message for a predetermined time, for example, one second, which is set by considering a network status, the mobile terminal 130 repeats the request message by a predetermined number of times, for example, three times, which is set by considering the network status, and transmits the request message to the AR 110. When the response message is not received as a result of the transmitting, the mobile terminal 130 may discard the IP address.

Figure 6:
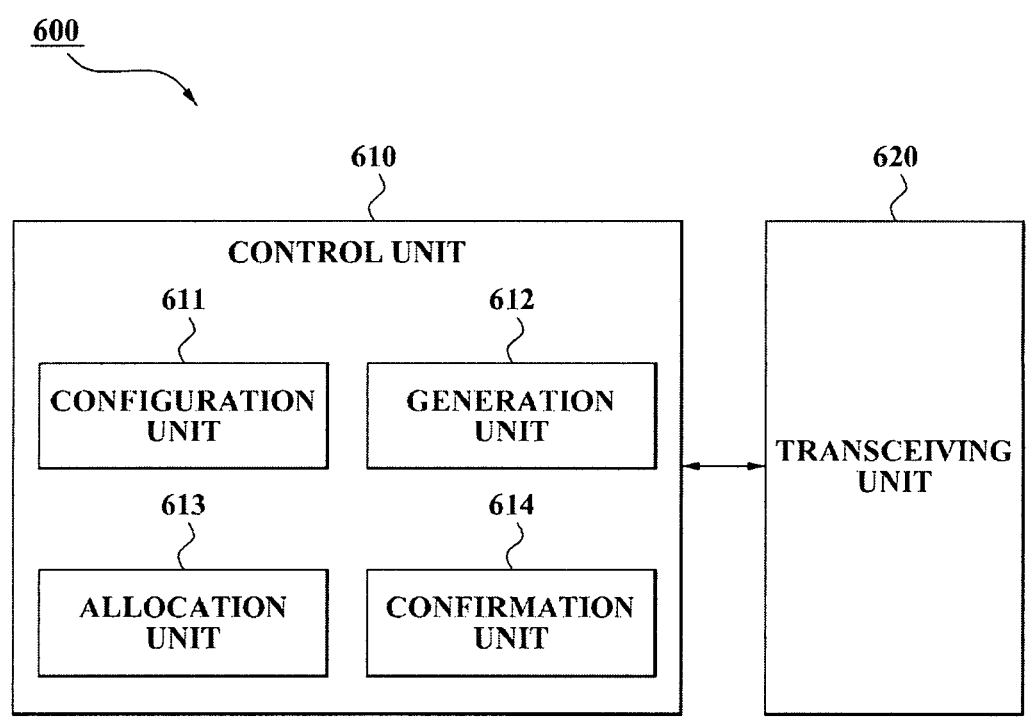
FIG. 6 is a block diagram illustrating an example of a configuration of a mobile terminal for allocating an IP address in a wireless network.

FIG. 6 is a block diagram illustrating an example of a configuration of a mobile terminal for allocating an IP address in a wireless network.

As illustrated in FIG. 6, the mobile terminal 600 for allocating an IP address in a wireless network may include a transceiving unit 620, and a control unit 610 including a configuration unit 611, a generation unit 612, an allocation unit 613 and a confirmation unit 614.

The control unit 610 may automatically configure an IP address and request an AR for a DAD with respect to the automatically configured IP address, when a notification message is inputted by the transceiving unit 620.

As an example, when the notification message is received from the transceiving unit 620, the configuration unit 611 automatically configures the IP address and the generation unit 612 may generate a request message including the automatically configured IP address.

When the response message is inputted from the transceiving unit 620, the confirmation unit 614 confirms a result of the performing of the DAD from the inputted response message. Also, the allocation unit 613 may validly allocate the IP address according to the confirmed result of the performing of the DAD.

The transceiving unit 620 receives the notification message, which is previously set, from the AR, and transmits the request message to the AR. Also, the transceiving unit 620 may receive the response message from the AR in response to the transmitted request message.

Figure 7:
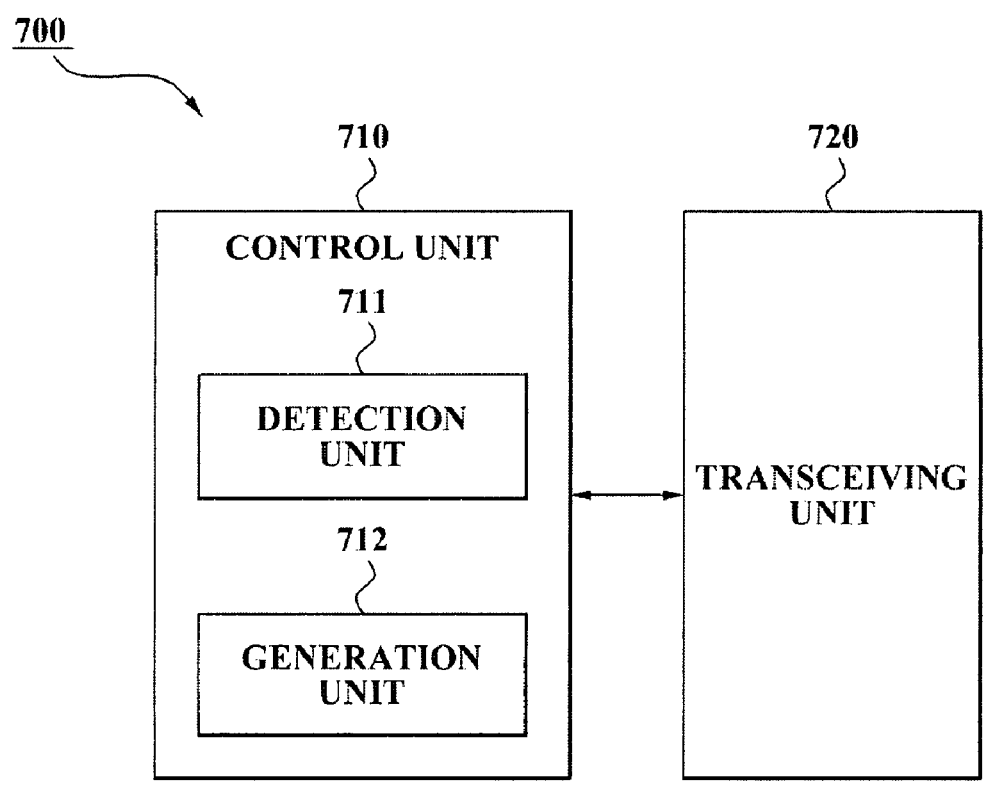
FIG. 7 is a block diagram illustrating an example of a configuration of an access router (AR) for allocating an IP address in a wireless network.

FIG. 7 is a block diagram illustrating an example of a configuration of an AR for allocating an IP address in a wireless network.

As illustrated in FIG. 7, the AR 700 for allocating an IP address in a wireless network may include a transceiving unit 720, and a control unit 710 including a detection unit 711 and a generation unit 712.

When a request message, which requests for a DAD with respect to an automatically configured IP address, is inputted from the transceiving unit 720, the control unit 710 may perform the requested DAD.

As an example, when the request message is inputted from the transceiving unit 720, the detection unit 711 performs the DAD with respect to the automatically configured IP address included in the received request message. Also, the generation unit 712 may generate a response message according to a result of the performing of the DAD.

The transceiving unit 720 transmits a previously set notification message to a mobile terminal, and receives the request message from the mobile terminal. Also, the transceiving unit 720 may transmit the response message to the mobile terminal in response to the received request message.

Also, when the notification message is received from a plurality of ARs which exist on a same link, the mobile terminal 130 automatically configures the IP address, and may transmit the request message including the automatically configured IP address to the plurality of ARs. Specifically, when the response message is received from the plurality of ARs, the mobile terminal 130 may validly allocate the automatically configured IP address.

General aspects may be recorded in computer-readable media including program instructions to implement various operations embodied by a computer. The media may also include, alone or in combination with the program instructions, data files, data structures, and the like. The media and program instructions may be those specially designed and constructed for the purposes of the general aspects, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described general aspects.

According to a general aspect, a method and mobile terminal for allocating an IP address in a wireless network in which the mobile terminal, when an AR transmits a message indicating the AR corresponds to a management AR, automatically configures an IPv6 address, performs a DAD with respect to the automatically configured IPv6 address via the AR, validly uses the automatically configured IP address, and thereby may prevent IPv6 addresses automatically configured in the mobile terminal from conflicting.

While general aspects have been shown and described, it will be understood by those skilled in the art that various changes in form and details may be made therein without departing from the scope of the following claims.

What is claimed is:

1. A method of allocating an Internet protocol (IP) address in a wireless network, the method comprising:
confirming receipt of a notification message transmitted from an access router (AR);
automatically configuring an IP address; and
requesting the AR to perform a duplicate address detection (DAD) with respect to the automatically configured IP address when the notification message is received,
wherein the notification message includes a router advertisement (RA) message defined in a neighbor discovery protocol for Internet protocol version 6 (IPv6), and the notification message includes a DAD option includes a field indicating a number of times the DAD is requested, a field indicating a DAD method of the connected link, and a field indicating a period of time that the IP address is stored in the address cache.

2. The method of claim 1, wherein the notification message includes a prefix information option.

3. The method of claim 1, wherein the requesting of the AR comprises:
automatically configuring the IP address when the notification message is received;

generating a request message including the automatically configured IP address;

transmitting the generated request message to the AR; and requesting the AR to perform the DAD.

4. The method of claim 3, wherein the request message includes a neighbor solicitation (NS) message defined in a neighbor discovery protocol for IPv6.

5. The method of claim 1, further comprising:
receiving a response message from the AR;
confirming a result of the request for the DAD; and
validly allocating the IP address according to the confirmed result of the request for the DAD.

6. The method of claim 5, wherein the response message includes a neighbor advertisement (NA) message defined in a neighbor discovery protocol for IPv6.

7. The method of claim 5, wherein the allocating of the IP address comprises:
allocating the automatically configured IP address when another mobile terminal, using an IP address identical to the IP address, does not exist; and
discarding the IP address when the other mobile terminal, using the automatically configured IP address identical to the IP address, exists.

8. The method of claim 1, wherein the requesting of the AR comprises:
automatically configuring the IP address; and
requesting a plurality of ARs to perform the DAD with respect to the automatically configured IP address when a plurality of notification messages is received from the plurality of ARs.

9. A method of allocating an Internet protocol (IP) address in a wireless network which is applied to a system including a mobile terminal and an access router (AR), the method comprising:
transmitting a notification message for informing of storing IP addresses, which are used on a connected link, in an address cache;
managing the IP addresses;
performing a duplicate address detection (DAD) based on the IP addresses to the mobile terminal; and
confirming receipt of a request message from the mobile terminal, the request message including a request for the performing of the DAD with respect to an automatically configured IP address from the mobile terminal,
wherein the notification message includes a router advertisement (RA) message defined in a neighbor discovery protocol for Internet protocol version 6 (IPv6), and the notification message includes a DAD option includes a field indicating a number of times the DAD is requested, a field indicating a DAD method of the connected link, and a field indicating a period of time that the IP address is stored in the address cache.

10. The method of claim 9, further comprising:
performing the DAD with respect to the automatically configured IP address, when the request message is received; and
transmitting a response message to the mobile terminal according to a result of the performing of the DAD.

11. The method of claim 10, wherein the transmitting comprises:
discarding the received request message when another mobile terminal, using an IP address identical to the IP address, exists;
storing the IP address in the address cache and transmitting the response message in response to the request message, when the other mobile terminal, using the IP address identical to the IP address, does not exist.

12. A non-transitory computer-readable recording medium storing a program, comprising:
a first set of instructions configured to confirm receipt of a notification message transmitted from an access router (AR);
a second set of instructions configured to automatically configure an Internet protocol (IP) address; and
a third set of instructions configured to request the AR to perform a duplicate address detection (DAD) with respect to the automatically configured IP address when the notification message is received,
wherein the notification message includes a router advertisement (RA) message defined in a neighbor discovery protocol for Internet protocol version 6 (IPv6), and the notification message includes a DAD option includes a field indicating a number of times the DAD is requested, a field indicating a DAD method of the connected link, and a field indicating a period of time that the IP address is stored in the address cache.

13. A mobile terminal configured to allocate an Internet protocol (IP) address in a wireless network, the mobile terminal comprising:
a transceiving unit configured to:
receive a notification message transmitted from an access router (AR); and
transmit a request message to the AR, the request message being configured to request the AR to perform a duplicate address detection (DAD) with respect to an automatically configured IP address; and
a control unit configured to, when the notification message is inputted by the transceiving unit:
automatically configure the IP address;
generate the request message; and
output the generated request message;
wherein the notification message includes a router advertisement (RA) message defined in a neighbor discovery protocol for Internet protocol version 6 (IPv6), and the notification message includes a DAD option includes a field indicating a number of times the DAD is requested, a field indicating a DAD method of the connected link, and a field indicating a period of time that the IP address is stored in the address cache.

14. The mobile terminal of claim 13, wherein the notification message comprises a prefix information option.

15. The mobile terminal of claim 13, wherein the control unit comprises:
a configuration unit configured to automatically configure the IP address when the notification message is received from the transceiving unit; and
a generation unit configured to:
generate the request message comprising the automatically configured IP address; and
output the generated request message to the transceiving unit.

16. The mobile terminal of claim 15, wherein the request message comprises a neighbor solicitation (NS) message defined in a neighbor discovery protocol for IPv6.

17. The mobile terminal of claim 13, wherein the control unit comprises:
a confirmation unit configured to confirm a result of the request for the DAD when a response message is received from the transceiving unit; and
an allocation unit configured to evenly allocate the IP address according to the confirmed result of the request for the DAD.

18. The mobile terminal of claim 17, wherein the response message comprises a neighbor advertisement (NA) message defined in a neighbor discovery protocol for IPv6, and the NA message comprises a field responding to the request for the DAD with respect to a target address.

19. The mobile terminal of claim 17, wherein the allocation unit is further configured to:
    validly allocate the IP address, when another mobile terminal, using an IP address identical to the IP address, does not exist; and
    discard the IP address, when the other mobile terminal, using the IP address identical to the IP address, exists.

20. The mobile terminal of claim 13, wherein, when a plurality of notification messages is received from a plurality of ARs, the mobile terminal is configured to:
    automatically configure an IP address; and
    request the plurality of ARs to perform the DAD with respect to the automatically configured IP address.

21. The mobile terminal of claim 13, wherein the mobile terminal comprises at least one of a mobile communication terminal, a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, and a satellite/terrestrial Digital Multimedia Broadcasting (DMB) phone.

22. An access router (AR) configured to allocate an Internet protocol (IP) address in a wireless network that is applied to a system including a mobile terminal and the AR, the AR comprising:
    a transceiving unit configured to:
        transmit a notification message informing of storing all IP addresses, which are used on a connected link, in an address cache;
        manage the IP addresses;
        perform a duplicate address detection (DAD) based on the IP addresses; and
        receive a request message from the mobile terminal, the request message being configured to request performing of the DAD with respect to an automatically configured IP address; and
    a control unit configured to:
        receive the request message from the transceiving unit; and
        perform the DAD according to the request message,
    wherein the notification message includes a router advertisement (RA) message defined in a neighbor discovery protocol for Internet protocol version 6 (IPv6), and the notification message includes a DAD option incluses a field indicating a number of times the DAD is requested, a field indicating a DAD method of the connected link, and a field indicating a period of time that the IP address is stored in the address cache.

23. The AR of claim 22, wherein the control unit comprises:
    a detection unit configured to perform the DAD with respect to the automatically configured IP address, when the request message is received from the transceiving unit; and
    a generation unit configured to:
        generate the response message; and
        output the generated response message to the transceiving unit.

24. The AR of claim 23, wherein the generation unit is further configured to:
    discard the received request message when another mobile terminal, using an IP address identical to the IP address, exists;
    store the IP address in the address cache, and transmit the response message in response to the request message, when the other mobile terminal, using the IP address identical to the IP address, does not exist.

25. A system configured to allocate an Internet protocol (IP) address, comprising:
    an access router (AR) configured to:
        store at least one IP address that can be used on a connected link in an address cache; manage the at least one IP address; and
        perform a duplicate address detection (DAD) based on the at least one IP address; and
    a mobile terminal configured to:
        confirm receipt of a notification message transmitted from the AR;
        automatically configure the at least one IP address; and
        request the AR to perform the duplicate address detection (DAD) with respect to the automatically configured at least one IP address when the notification message is received
    wherein the notification message includes a router advertisement (RA) message defined in a neighbor discovery protocol for Internet protocol version 6 (IPv6), and the notification message includes a DAD option includes a field indicating a number of times the DAD is requested, a field indicating a DAD method of the connected link, and a field indicating a period of time that the IP address is stored in the address cache.

26. The system of claim 25, wherein the mobile terminal comprises:
    a transceiving unit configured to:
        receive the notification message transmitted from the access router (AR); and
        transmit a request message to the AR to request the AR to perform the DAD with respect to the automatically configured at least one IP address; and
    a control unit configured to, when the notification message is inputted by the transceiving unit:
        automatically configure the at least one IP address;
        generate the request message; and
        output the generated request message.

27. The system of claim 25, wherein the notification message comprises a prefix information option, the prefix information option comprising a field indicating an option corresponding to a prefix used for a stateless address auto-configuration.

* * * * *